Patented Nov. 15, 1927.

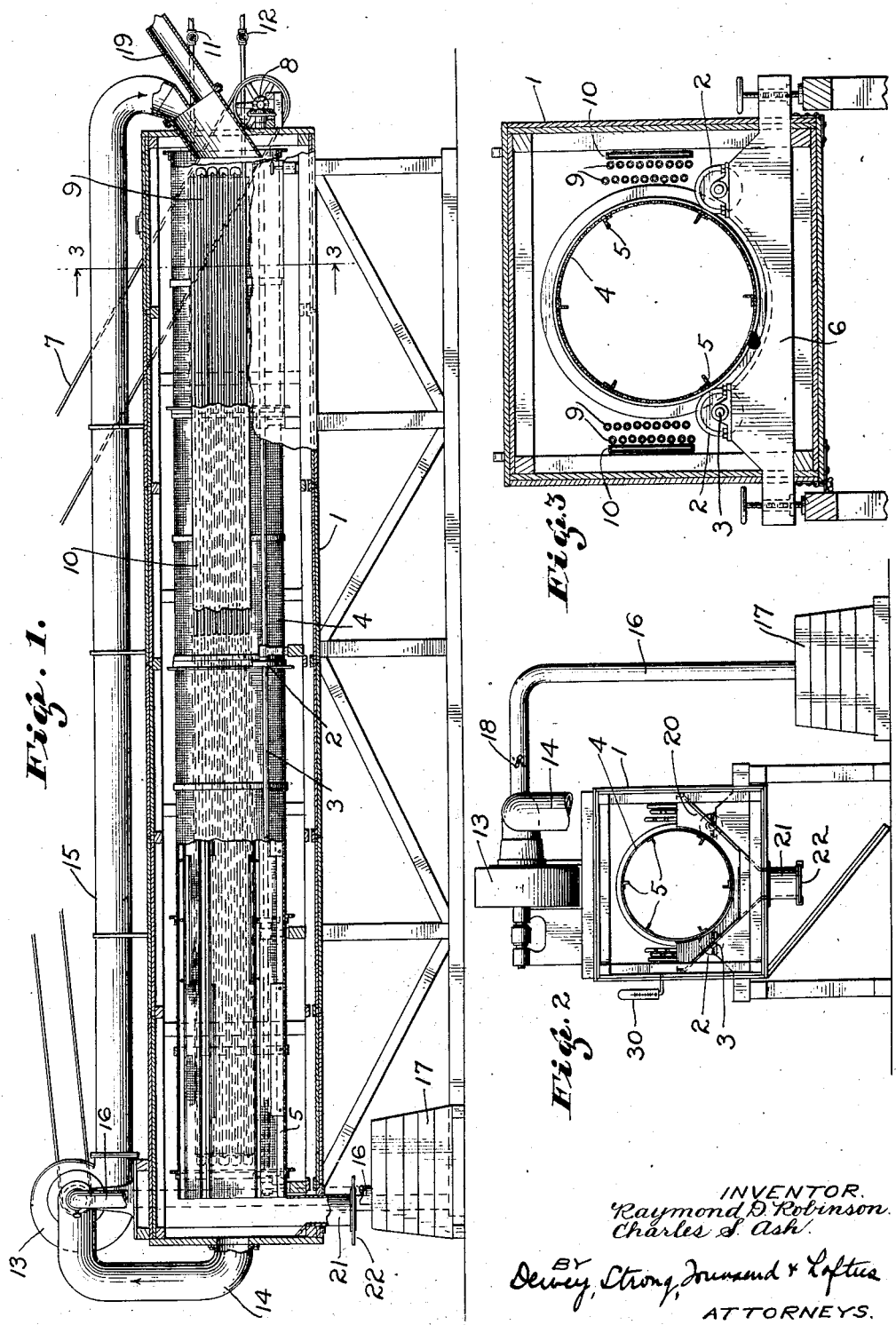

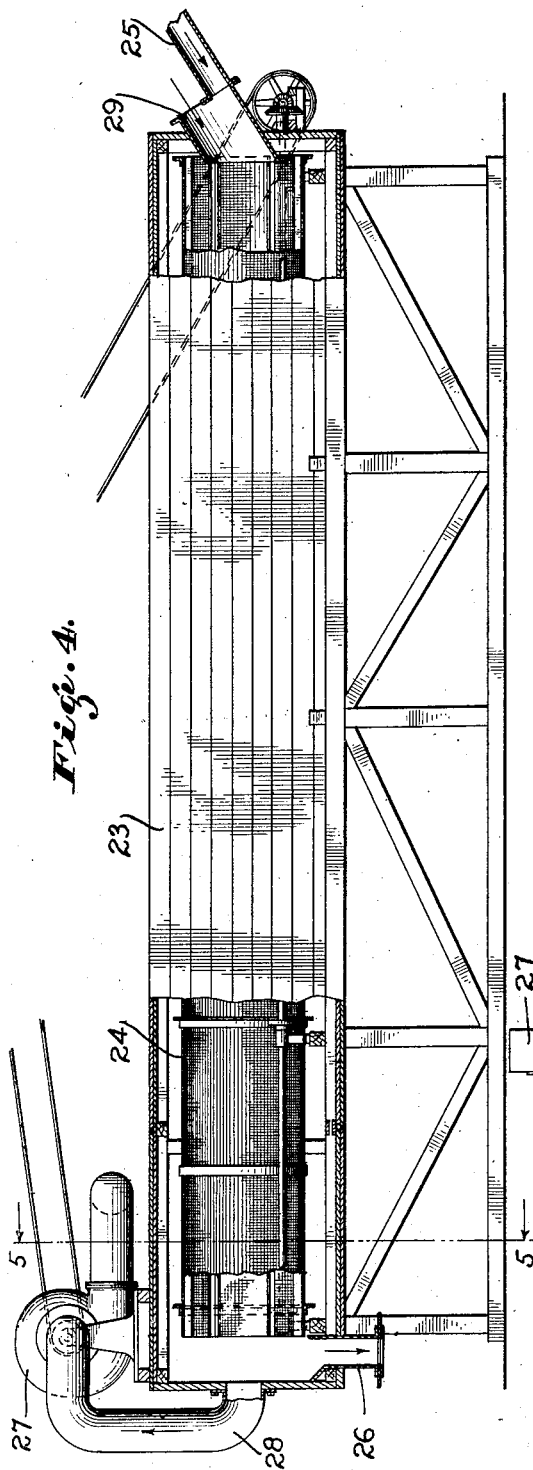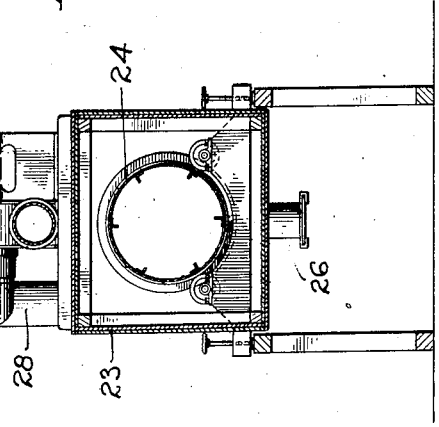

1,649,488

UNITED STATES PATENT OFFICE.

RAYMOND D. ROBINSON AND CHARLES S. ASH, OF SAN FRANCISCO, CALIFORNIA, ASSIGNORS TO CALIFORNIA PACKING CORPORATION, OF SAN FRANCISCO, CALIFORNIA, A CORPORATION OF NEW YORK.

PROCESS FOR TREATING DRIED FRUIT.

Application filed April 6, 1925. Serial No. 20,963.

This invention relates to a process for treating dried fruit to destroy insect infestation, to prepare the fruit for storage or marketing.

During the sun-drying of fruit, such as raisins, many insects (including particularly moths) lay their eggs upon or in the fruit. When the fruit is washed in processing, not all of these eggs and resulting larvæ are removed, and the subsequent hatching of the eggs and developing of the larvæ renders the fruit wormy.

It has been the usual practice to treat the fruit by chemical means (fumigation) to destroy this insect life. Fumigation may be effective to destroy the insects or larvæ, but is has little effect on the eggs. This is evidenced by the fact that the eggs may subsequently hatch and the fruit become wormy. There are other objections to fumigation, including the danger to the operator and the fire hazard.

By our invention, we propose to destroy this insect life by the action of heat, and not chemical agents. When higher living organisms, such as insects or eggs, are subjected for the necessary period of time to a temperature at which coagulation of albumen takes place, the life is destroyed. In the insect, the soluble fluids of the body become in part insoluble, and the insect perishes. In the egg, composed largely of liquid (soluble) albumen, the form is changed by the action of the heat from a liquid to a solid, and becomes sterile.

The heating of dried fruit, such as raisins or the like, sufficiently to produce coagulation of albumen, presents a number of practical difficulties. It is important that the heating is not too long, for if it is, the fruit is darkened and deteriorates. It is also important that the fruit be rapidly cooled to a temperature considerably under the coagulating point of albumen, so that the temperature will only affect the surface of the fruit where insect infestation occurs, and not the sterile center portion of the fruit. The problem is essentially one of obtaining the necessary heat effect in a relatively short time in order that the fruit may not deteriorate or sweat.

Commercially dried fruit contains some moisture, and this is in part released at a temperature great enough to produce a coagulation of albumen. We have found that this fact must be taken into consideration in a process of this character, and if properly controlled, serves as an effective medium in the process. Air laden with water imparts its heat more rapidly to the material heated than does dry atmosphere. One cubic foot of air saturated with water will impart its temperature to the body it surrounds more rapidly than would one cubic foot of dry air, or, in other words, it has more heating value than dry air. The specific heat of water, for instance, is 1.0, while the specific heat of air is a little less than one-fourth that value. The moisture evolved from the dried fruit produces a moist atmosphere at the temperatures involved, and this moist atmosphere, under proper control, functions as an effective heating agent to materially reduce the time that the fruit must be exposed to the elevated temperature. The moisture content of the fruit must be maintained under control in order that water is not precipitated from the atmosphere to settle upon the fruit.

We have found that the dried fruit may be exposed to a temperature sufficient to produce the coagulation of albumen required for the destruction of insect life within the required time limit necessary to avoid deterioration of the fruit, provided the atmosphere surrounding the fruit during the period of heating is circulated under proper control to maintain a humid atmosphere of high specific heat, from which there is no substantial amount of water precipitated upon the fruit. The velocity of the atmosphere produced by the proper circulation of air over the fruit further serves to prevent the settling on the fruit of such amounts of water as would result in a product so sticky or damp as would be difficult to handle, or unusable, and prevents portions of the fruit becoming overheated or overdampened by maintaining a uniform temperature and humidity.

We prefer to maintain the humidity of the atmosphere at about 90°, and because a small amount of water may be absorbed by the fruit from this warm, misty atmosphere, it is important that the product be rapidly cooled and dried upon emerging from the heating zone. When the humidity of the atmosphere in the heating zone is properly controlled, the fruit produced is substantially dry or dries almost immediately. This drying can be facilitated in the cooling process by blowing large volumes of cool or cold air over the fruit, the circulation of cold air taking up the water and producing a rapid drying of the product. This rapid cooling and drying of the product limits the effect of the heat to the surface of the fruit where insect infestation occurs, and avoids the production of an objectionable sticky or wet product. It is highly desirable to obtain the necessary heat effect to destroy the insect life in such a manner as to produce a relatively free running product.

The specific time, temperature or humidity employed in the operation of our process may be varied within considerable limits, because the practical destruction of insect life can be effected at a wide range of temperatures extending up to and even over 500° F. or 600° F., dependent upon the time of exposure. The higher the temperature employed, the shorter is the contact period required. If the contact period is too long at a particular temperature used, deterioration of the product ensues, and the problem is one of employing a proper combination of time and temperature. This can best be determined in a given case by experiment, and no exact rule is required or can be stated. It is generally considered that an exposure for five minutes at a temperature of 120° F., or an exposure of three minutes at a temperature of 150° F. is sufficient to destroy insect life. The degree of humidity required may also be varied, depending upon the temperature and time of exposure, because the humidity functions to raise the specific heat of the atmosphere and augment the heating effect.

Depending upon the temperature employed and the time of exposure, the process may be operated with either very dry air or air saturated with moisture. In practical operation, we have found that because the raisins give off considerable water upon heating, the tendency is to saturate the atmosphere. It is very difficult, if not impossible, to operate at less humidity without the expenditure of unnecessarily large quantities of air, and in consequence, heat. We consider a relatively dry air to be undesirable for the reason that on account of the large amount of water held in suspension, the specific heat of the humid air is greater than that of the drier air, so that the desired temperature is transmitted to the fruit in question more rapidly and more uniformly with a humid atmosphere than with a drier air. On the other hand, air too heavily supersaturated with water is to be avoided to prevent the condensate from the raisins raising the percentage of moisture to a degree so as to make the raisins sticky and impede the further processing of the product. We have obtained highly satisfactory results from operating under the following conditions:

|  | To sterilizer. | Front temp. | Back temp. | From ster. | When packed. | Time of process. |
|---|---|---|---|---|---|---|
|  | ° | ° | ° | ° | ° | Min. |
| Std. Thompson | 83 | 135 | 167 | 139 | 84 | 7 |
| Sultanas | 84 | 140 | 160 | 136 | 86 | 7 |
| Std. Thompson | 83 | 142 | 163 | 137 | 84 | 7 |
| Ex. Std. Thompson | 82 | 136 | 167 | 138 | 84 | 7 |

The atmosphere in the sterilizing chamber during the foregoing operations has been maintained at a relative humidity of between 85% and 90% saturation. The rate of circulation of air required to maintain this saturation in these operations cannot be accurately measured, but a fan was employed having a total diameter of 48 inches and a width of 13 inches. The inlet diameter to the fan was 11½ inches and the outlet 12½ inches, the fan having a speed of 1000 revolutions per minute. It will be understood that all of these factors are variable relative to each other, and that for given conditions of operation, best results can be obtained within the principle stated aforesaid.

The apparatus in which our process may be performed may vary considerably, but ordinarily the operation is preferably carried out as a continuous process and in a chamber wherein the temperature and humidity of the air may be definitely controlled, and in which the air is heated and caused to continuously circulate through the chamber, the fruit being continuously passed through such chamber in contact with the heated air.

In the accompanying drawings, we have illustrated certain specific embodiments of an apparatus by which our invention can be carried out. It will be understood, however, that the invention can be otherwise embodied and that the drawings are not to be construed as defining or limiting the scope of the invention, the claims appended to this specification being relied upon for that purpose.

Referring to the figures of the drawings:

Fig. 1 is a side elevation mostly in longitudinal section of the heat treating portion of our apparatus.

Fig. 2 is an end view thereof with the end cover removed.

Fig. 3 is a cross sectional view taken on line 3—3 of Fig. 1.

Fig. 4 is a side elevation partially in longitudinal section of the cooling apparatus.

Fig. 5 is an end view thereof.

Referring more specifically to the drawings, 1 indicates an elongated container which may be constructed of wood or any suitable material. Mounted on rollers 2 carried by shafts 3 within this container is a foraminous cylinder cage 4 which may be constructed principally of heavy, coarse mesh wire. Baffle plates 5 are mounted within the cage and extend lengthwise therein, as illustrated. The rollers 2 or blocks 6 on which the rollers are mounted may be made vertically adjustable, as illustrated in Fig. 3, whereby the cage can be adjusted to the proper inclination. The shafts 3 on which the rollers 2 are mounted are adapted to be driven from a belt 7 through driving connections at 8.

Steam coils 9 are provided within the chamber adjacent the cage. Other means are provided within the chamber rearwardly of the steam coils at 10 for blowing superheated steam on to the steam coils. The steam and super-heated steam are regulated by valves 11 and 12.

Air circulating means for the apparatus is provided as follows. A blower 13 is mounted on one end of the container 1. Pipes 14 and 15 connect the blower with the opposite ends of the cage. In operation, the air is drawn outwardly through the pipe 14 and forced through the pipe 15 to the opposite end of the cage. It may be desired in some cases to mix a treating gas with the heated air in the cage. Such a gas can be provided through a pipe 16 extending from a gas container 17 to the pipe 14. Communication with the pipe 16 is controlled by a damper 18.

A chute 19 is provided at one end of the container for feeding the fruit into the cage 4. A hopper 20 and chute 21 with a gate 22 are provided at the opposite end of the container for discharging the fruit.

In Figs. 4 and 5 is illustrated a cooler through which the fruit is passed after being heat treated. The construction of the container 23 and cage 24 of the cooler may be identically the same as the container 1 and cage 4 above described. The fruit is adapted to be fed into the cage through a chute 25 and discharged therefrom through a hopper and chute 26. A blower 27 is connected to one end of the cage at 28 and the other end thereof is open to the cold outside air at 29. The blower is, therefore, adapted to continuously draw cold air through the cage in contact with the agitated fruit as the cage is rotated.

The operation of the device is substantially as follows. The air within the container 1 and cage 4 is first heated to the proper temperature by admitting steam to the coils 9. This temperature may be gauged by means of a thermometer 30 mounted on the outside of the container and in communication with the chamber therein. The temperature and humidity of the air within the container can be further regulated by supplying superheated steam on to the steam coils through the member 10. The blower 13 is operated to continuously circulate the heated air through the cage, the air being carried from one end of the cage to the opposite end through the pipe 14, blower 13 and pipe 15.

When the air within the chamber is in the proper treating condition, the cage is rotated and the fruit fed thereinto through the chute 19. The rollers 2 or their supports 6 having been adjusted to incline the cage slightly downwardly toward the discharging end 20, the fruit will gradually move toward such end as the cage rotates. The baffle plates carry the fruit toward the top of the cage from which it is dropped downwardly through the circulating air. In this manner the air has a free and uniform distribution through the fruit as it is circulated through the chamber. The downward slope of the cage is such that the fruit is in contact with the air long enough to be thoroughly treated to kill all insects, larvæ and eggs therein. Also the air is so regulated as to in no way injure or affect the fruit adversely. It will be understood that the temperature and humidity of the heated air will vary somewhat with the fruit being treated, some fruit and its condition being able to stand more heat than other fruit.

Should it be desired to mix a treating gas with the heated air, such gas can be supplied through the pipe 16. This gas may preferably be raised to a high temperature before being mixed with the air. Upon reaching the discharging end of the cage the fruit drops into the hopper 20 and is removed through the chute 21 and gate 22.

To prevent any objectionable after effects on the fruit due to the heating thereof, it is desirable that the same be thoroughly cooled as quickly as possible. We, therefore, pass the treated fruit from the chute 21 through the cooling apparatus shown in Figs. 4 and 5. The treated fruit enters the cage 24 through the chute 25 and is passed through the cage to the hopper and chute 26 in the same manner as it passed through the cage 4. The blower continuously circulates cold air through the cage and the baffle plates agitate the fruit through this cold air whereby a free and uniform distribution of air through the fruit is obtained. The fruit is thereby quickly cooled and leaves the chute 26 in a dry, free running condition and thoroughly cleaned of all insect life.

Having thus described our invention, what we claim and desire to secure by Letters Patent is:

1. The process of treating raisins and other dried fruit which comprises passing the fruit through a chamber, maintaining the chamber at a temperature sufficient to destroy insect life, providing a circulation of air through the chamber, and thereafter cooling the fruit.

2. The process of treating raisins and other dried fruit which comprises passing the fruit through a heated chamber, providing a circulation of atmosphere in the chamber to maintain therein a uniform humidity and temperature sufficient to rapidly destroy insect life, and thereafter immediately and quickly cooling the fruit.

3. The process of treating raisins and other dried fruit which comprises passing the fruit through a chamber in which the fruit is rapidly heated to a temperature sufficient to destroy insect life, providing a circulation of the atmosphere in the chamber to maintain an unsaturated humidity of high specific heat, and thereafter immediately cooling the fruit.

4. The process of treating raisins and other dried fruit which comprises passing the fruit through a chamber in which the fruit is rapidly heated to a temperature sufficient to destroy animal life, providing a circulation of the atmosphere in the chamber to prevent overheating and overdampening of the fruit, and immediately passing the fruit to a cooling chamber in which cool air is circulated to rapidly cool and dry the fruit.

RAYMOND D. ROBINSON.
CHARLES S. ASH.